(12) United States Patent
Rahimzadeh et al.

(10) Patent No.: US 8,898,992 B2
(45) Date of Patent: Dec. 2, 2014

(54) BUILDING STRUCTURES AND CONSTRUCTION METHODS

(75) Inventors: Housh Rahimzadeh, Alpharetta, GA (US); Marc Rahimzadeh, Alpharetta, GA (US)

(73) Assignee: Diversakore Holdings, LLC, Alpharetta, GA (US)

( * ) Notice: Subject to any disclaimer, the term of this patent is extended or adjusted under 35 U.S.C. 154(b) by 30 days.

(21) Appl. No.: 13/508,126

(22) PCT Filed: Nov. 8, 2010

(86) PCT No.: PCT/US2010/055810
§ 371 (c)(1),
(2), (4) Date: Aug. 1, 2012

(87) PCT Pub. No.: WO2012/047243
PCT Pub. Date: Apr. 12, 2012

(65) Prior Publication Data
US 2012/0317919 A1    Dec. 20, 2012

Related U.S. Application Data

(60) Provisional application No. 61/259,104, filed on Nov. 6, 2009.

(51) Int. Cl.
| | |
|---|---|
| *E04B 5/10* | (2006.01) |
| *E04B 5/06* | (2006.01) |
| *E04B 5/02* | (2006.01) |
| *E04B 5/12* | (2006.01) |
| *E04B 1/30* | (2006.01) |
| *E04B 1/16* | (2006.01) |
| *E04B 5/04* | (2006.01) |

(52) U.S. Cl.
CPC . *E04B 1/165* (2013.01); *E04B 5/10* (2013.01);
*E04B 5/06* (2013.01); *E04B 5/026* (2013.01);
*E04B 5/12* (2013.01); *E04B 1/30* (2013.01);
*E04B 5/043* (2013.01)
USPC ........ 52/655.1; 52/252; 52/650.3; 52/745.15; 403/187

(58) Field of Classification Search
CPC .............. E04B 1/24; E04B 2001/2415; E04B 2001/2448; E04B 1/2403; E04B 2001/2457; E04B 1/19; E04B 1/1903; E04B 2001/24
USPC ............. 52/263, 299, 650.3, 655.1, 252, 283, 52/745.15; 403/186, 187
See application file for complete search history.

(56) References Cited

U.S. PATENT DOCUMENTS 1,803,371 A * 5/1931 Venzie ............................. 52/323
3,513,610 A * 5/1970 Devonport ....................... 52/283
(Continued)

FOREIGN PATENT DOCUMENTS

| GB | 2436574 A | * 10/2007 | |
| KR | 20030079993 A | * 8/2003 | |
| WO | WO 2009002865 A1 | * 12/2008 | ................ E04B 1/30 |

*Primary Examiner* — Adriana Figueroa
(74) *Attorney, Agent, or Firm* — Parks IP Law LLC; Stephen J. Terrell (57) ABSTRACT

A system including a column (12), a first connecting element (30) extending from the column (12), a beam (14), and a second connecting element (70). The beam includes a base wall (42) at least partially defining a cavity (40) and a cutout (48) in the base wall (42) that is configured to receive the column (12) and that is configured with respect to the first connecting element (30). The second connecting element (70) is disposed in the cavity (40), and the first and second connecting elements (30, 70) are configured to connect the beam (14) to the column (12).

20 Claims, 6 Drawing Sheets

(56) References Cited

U.S. PATENT DOCUMENTS

| | | | |
|---|---|---|---|
| 4,014,089 A * | 3/1977 | Sato et al. | 29/525.11 |
| 4,171,173 A * | 10/1979 | Hymans | 403/189 |
| 4,250,679 A * | 2/1981 | Burg | 52/655.1 |
| 4,398,841 A * | 8/1983 | Kojima et al. | 403/173 |
| 4,951,438 A * | 8/1990 | Thoresen | 52/252 |
| 5,242,239 A * | 9/1993 | Hosokawa | 403/258 |
| 5,660,017 A * | 8/1997 | Houghton | 52/655.1 |
| 6,073,405 A * | 6/2000 | Kasai et al. | 52/283 |
| 6,474,902 B1 * | 11/2002 | Beauvoir | 403/403 |
| 6,739,099 B2 * | 5/2004 | Takeuchi et al. | 52/167.1 |
| 7,178,296 B2 * | 2/2007 | Houghton | 52/261 |
| 7,216,465 B2 * | 5/2007 | Saldana | 52/655.1 |
| 7,762,038 B2 * | 7/2010 | Ceba et al. | 52/653.1 |
| 7,874,120 B2 * | 1/2011 | Ohata et al. | 52/655.1 |
| 2006/0144006 A1 * | 7/2006 | Suzuki et al. | 52/655.1 |
| 2013/0074430 A1 * | 3/2013 | Morcous et al. | 52/252 |

* cited by examiner

Fig_3

Fig. 5

Fig_6

Fig_7

BUILDING STRUCTURES AND CONSTRUCTION METHODS

CROSS REFERENCE TO RELATED APPLICATION

This application claims priority to U.S. Provisional Application No. 61/259,104, filed Nov. 6, 2009, the entirety of which is herein incorporated by reference.

TECHNICAL FIELD

This disclosure relates generally to building or framing structures and construction methods.

BACKGROUND

In the field of building construction, and specifically with respect to the erection of multi-story buildings, the frame or framing structure is the main load-bearing structure that maintains stability and structural integrity. The typical multi-story framing structure consists of a plurality of columns interconnected with beams and flooring sections supported by the beams.

The present disclosure relates to an improved framing structure for use with multi-story buildings. Such a framing structure may satisfy future needs by providing buildings that better withstand dynamic loads caused by high winds, blasts, impacts, and similar destructive effects.

SUMMARY

The various embodiments of the present disclosure overcome shortcomings of the prior art by providing a framing structure having a shear connection between a beam and a column. In one embodiment, the shear connection is embedded in a poured bonding core that, for example, integrally connects columns, beams, and flooring sections. By exemplary embodiments, the present disclosure teaches a framing structure having elements that can be quickly erected and then integrally connected, such as by a poured bonding core.

One advantage of the shear connection described herein is that connecting elements used to make the connection facilitate easily dropping a beam into a supported position during construction. Advantages of embodiments in which a connection between the beam and the column is embedded in the poured bonding core is that the connection is reinforced, fire resistant, and hidden.

Forming a framing structure by methods described herein virtually eliminates temporary shoring and temporary forms. Further, a poured bonding core is easily formed by elements of the framing structure being arranged to channel a pourable bonding material into and through various elements. Because the pourable bonding material flows into or embeds elements of the connection, the elements are integrally connected to one another by the poured bonding core, and the framing structure has increased strength and rigidity.

As used herein, the term "bonding" is used to include materials that can form structures that link, connect, form a union between, or attach multiple structures to form a composite structure. As used herein, the term "pourable" is used to include material in a state where the material conforms generally to the shape of the container in which it is poured. The term "core" is used to include a structure that has solidified to form a substantially rigid structure. The term "shear connection" refers to a connection configured to transfer shear forces. These terms are used for purposes of teaching and in a non-limiting manner.

The foregoing has broadly outlined some of the aspects and features of the present disclosure, which should be construed to be merely illustrative of various potential uses of the systems and methods of the present disclosure. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION OF THE INVENTION

As required, detailed embodiments are disclosed herein. It must be understood that the disclosed embodiments are merely exemplary of the teachings of the disclosure that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

Overview of Building Structure

Figure 1:
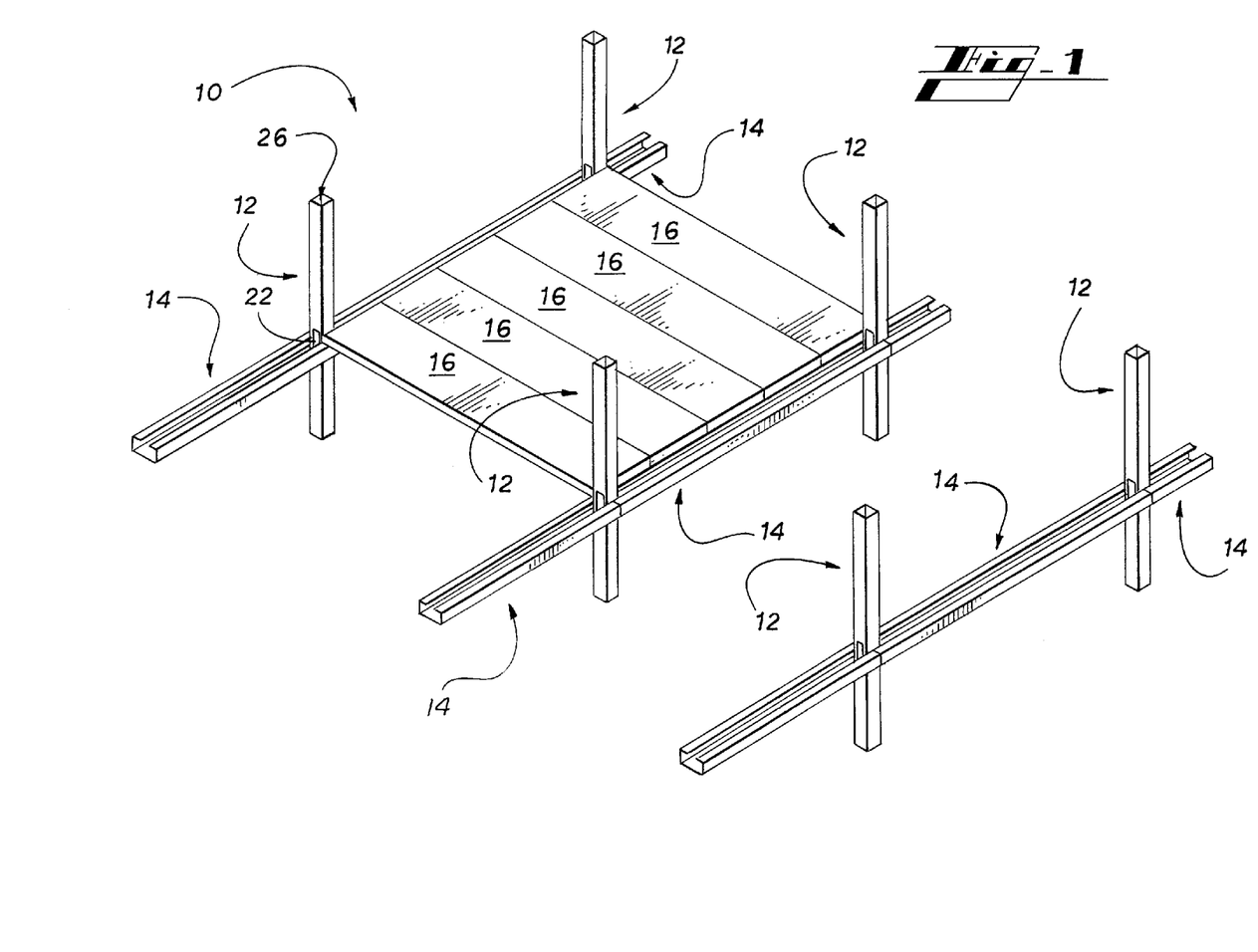
FIG. 1 is a partial perspective view of a framing structure, according to an exemplary embodiment of the present disclosure.
Figure 3:
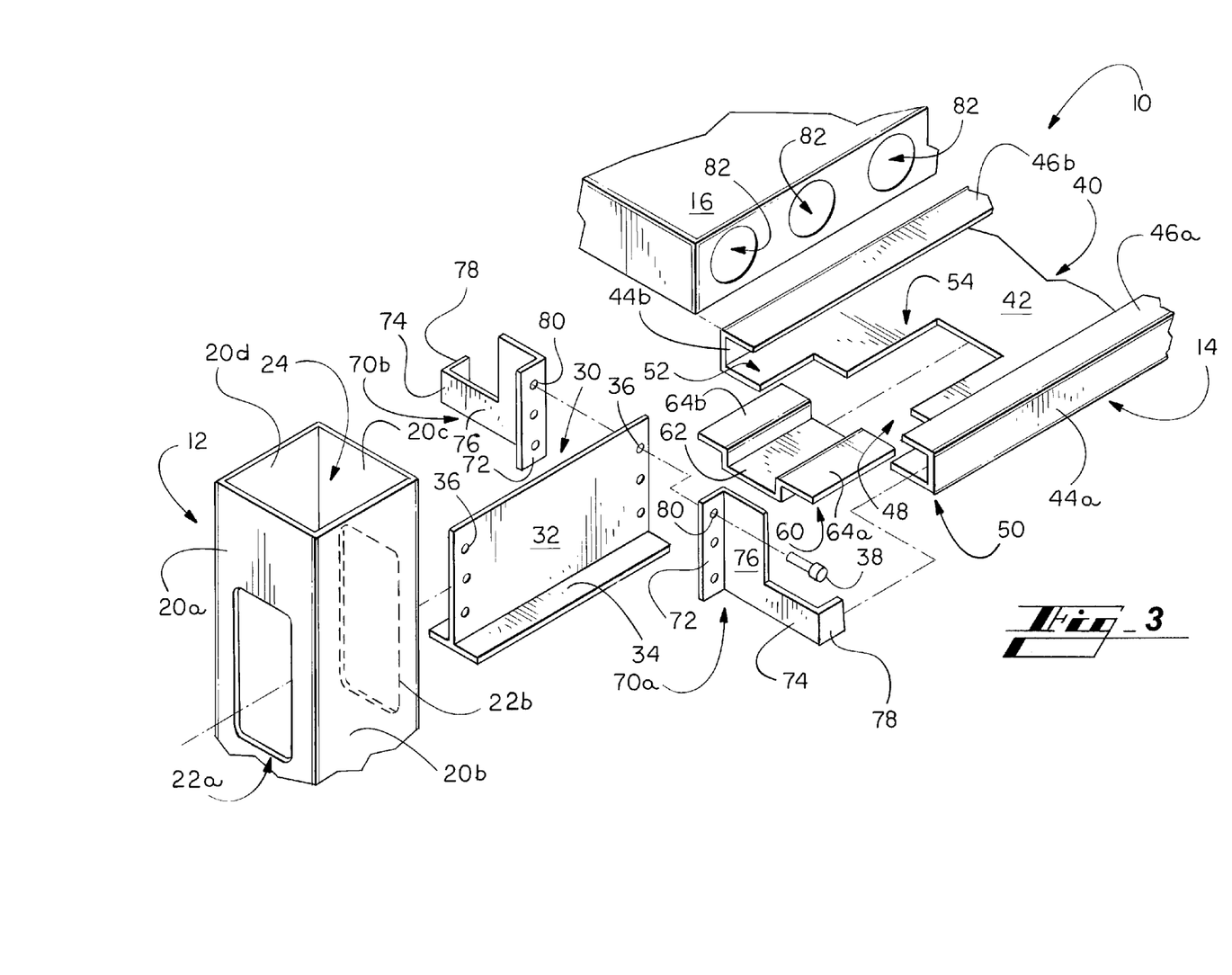
FIG. 3 is an exploded view of the framing structure of FIG. 2.
Figure 4:
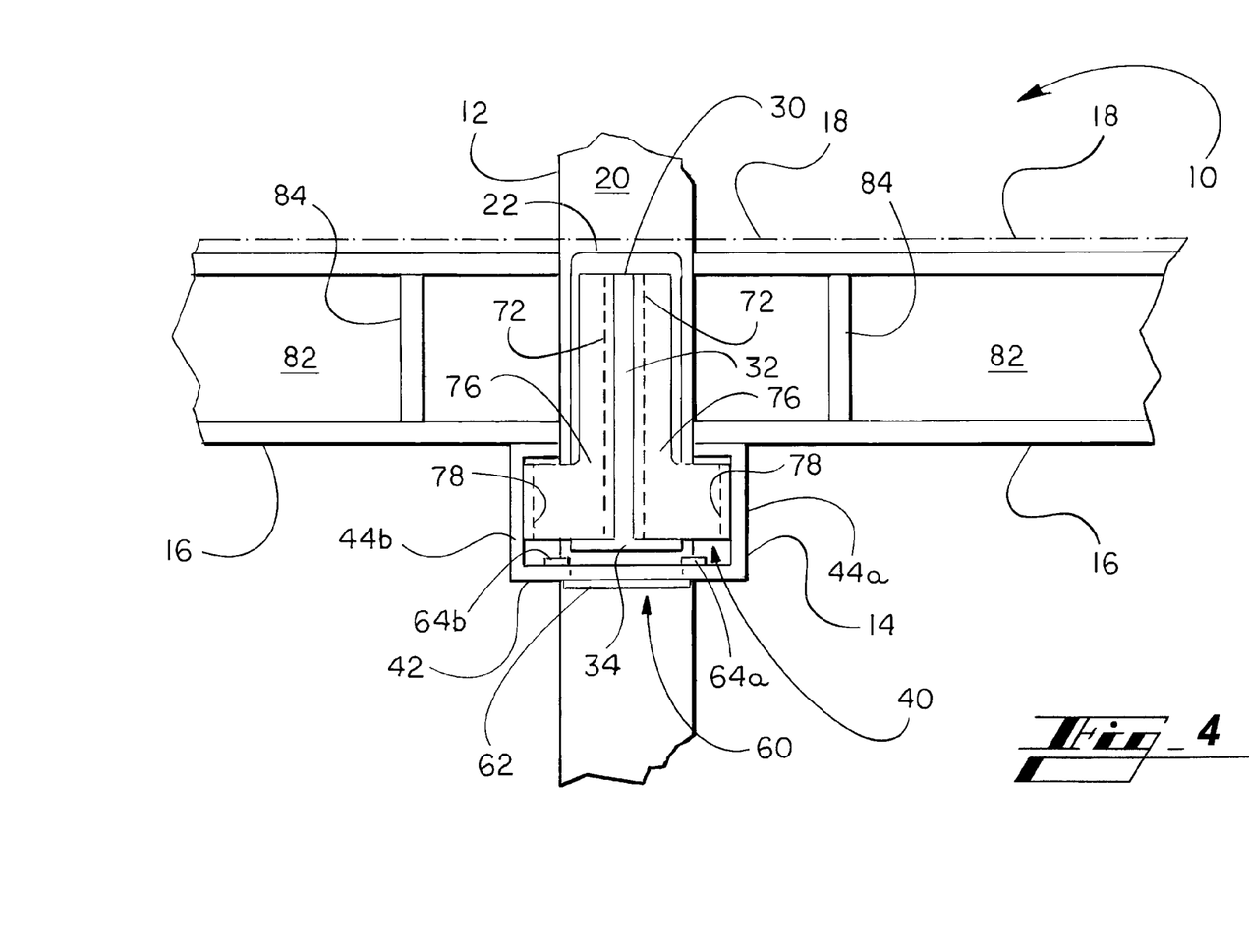
FIG. 4 is a fragmentary cross-sectional elevation view of the framing structure of FIG. 2.

Referring to FIG. 1, an exemplary embodiment of a framing structure 10 includes a plurality of columns 12, a plurality of beams 14, connecting elements (shown in more detail in FIGS. 2-5) configured to connect columns 12 and beams 14, a plurality of flooring sections 16, and a poured bonding core 18 (shown in detail in FIG. 4).

The exemplary columns 12, beams 14, connecting elements, and flooring sections 16 shown in the figures are formed from material or materials that have characteristics which meet minimum performance requirements, and in some embodiments include steel, aluminum, wood, pre-cast concrete, composite materials, combinations thereof, and the like.

Referring momentarily to FIG. 4, the poured bonding core 18 is pourable bonding material 18 that has solidified. As used herein, the term pourable bonding material is used to include a bonding material in a moldable or substantially liquid state and the term poured bonding core is used to include the bonding material in a substantially rigid or solidified state. Such bonding materials can include concrete, plasticized materials, cementitious materials, cement, grout, Gyperete®, combinations thereof, and the like.

Continuing with FIG. 1, generally described, the beams 14 extend in a longitudinal direction and ends thereof are supported by columns 12 at a height that corresponds to a floor or level of the framing structure 10. One or more flooring sections 16 extend in a transverse direction and the ends thereof are supported by beams 14. The illustrated flooring sections 16 define a base layer of a floor or level of the framing structure 10. As will be described in further detail below, the poured bonding core 18 integrates the columns 12, the beams 14, connecting elements (described in more detail below), and the flooring sections 16 such that the resulting framing structure 10 is substantially unitary and has improved structural characteristics, as described herein. Further, the connecting elements are in some embodiments embedded in the poured bonding core 18 so as to be hidden, reinforced, and fire-resistant.

Connecting elements, including a first connecting element associated with a column 12 and a second connecting element associated with a beam 14, are configured to support and position an end of the beam 14 with respect to an adjacent column 12. Exemplary connecting elements that provide a shear connection between the column 12 and the beam 14 are described in further detail below.

Referring to FIGS. 2-5, elements of the framing structure 10 are described in further detail. Here, the illustrated framing structure 10 is formed from pluralities of like-numbered elements that are substantially similar to those described above with reference to FIG. 1. For clarity, a representative one or representative ones of the like-numbered elements are described in detail, although this description is generally applicable to each of the other like-numbered elements. Further, numbers alone are used generally to reference a like-numbered element or group of like-numbered elements and suffixes such as "a" or "b" are attached to the numbers in order to reference individual ones of the like-numbered elements. For example, a wall of the column 12 can be referenced generally as wall 20 or individually referenced as wall 20a, 20b, 20c, or 20d.

Columns

Referring now to FIGS. 2-5, the illustrated column 12 has a hollow interior 24 and in some embodiments a substantially square cross-section defined by four walls 20. Other shapes for the column 12 are contemplated, such as a generally pentagonal cross-section, a generally hexagonal cross-section, etc. The column 12 includes openings 22 in the walls 20 providing a passageway between an exterior and the interior 24 of the column 12. The size, shape, and in some embodiments the number of openings 22 are configured to allow a pourable bonding material 18 to flow through the openings 22. In alternative embodiments, the column 12 is poured-in-place or pre-cast concrete, or the like.

The illustrated openings 22 are disposed in the column 12 at positions that generally correspond to where the ends of beams 14 are to meet the column 12. In other words, the openings 22 are positioned to generally correspond to the floors or levels of the framing structure 10. In the illustrated embodiment, the column 12 includes openings 22a, 22b in opposing walls 20a, 20c, respectively. The openings 22a, 22b are substantially aligned with one another.

First Connecting Element

Referring to FIG. 3, the illustrated first connecting element is an inverted T-beam 30 that is configured to be assembled with the column 12. The T-beam 30 includes an inner connecting plate 32 and a lower flange 34. The T-beam 30 is configured to be received in the openings 22a, 22b as described in further detail below. It should be appreciated that the first connecting element can have other shapes, such as cross-sectional shapes other than a T cross-sectional shape.

The inner connecting plate 32 is configured to connect to a second connecting element (e.g., cantilever structures 70a, 70b, described further below) associated with the beam 14. The illustrated connecting plate 32 includes apertures 36 for receiving bolts 38, though other elements may be used to connect the first connecting element to the second connecting element.

It should be understood that the first connecting element can include various structures that cooperate with the second connecting element to provide a support and/or structure for connecting the column 12 and beam 14 including a fin or protrusion, combinations thereof, and the like.

Method of Connecting the Column and the First Connecting Element

Figure 5:
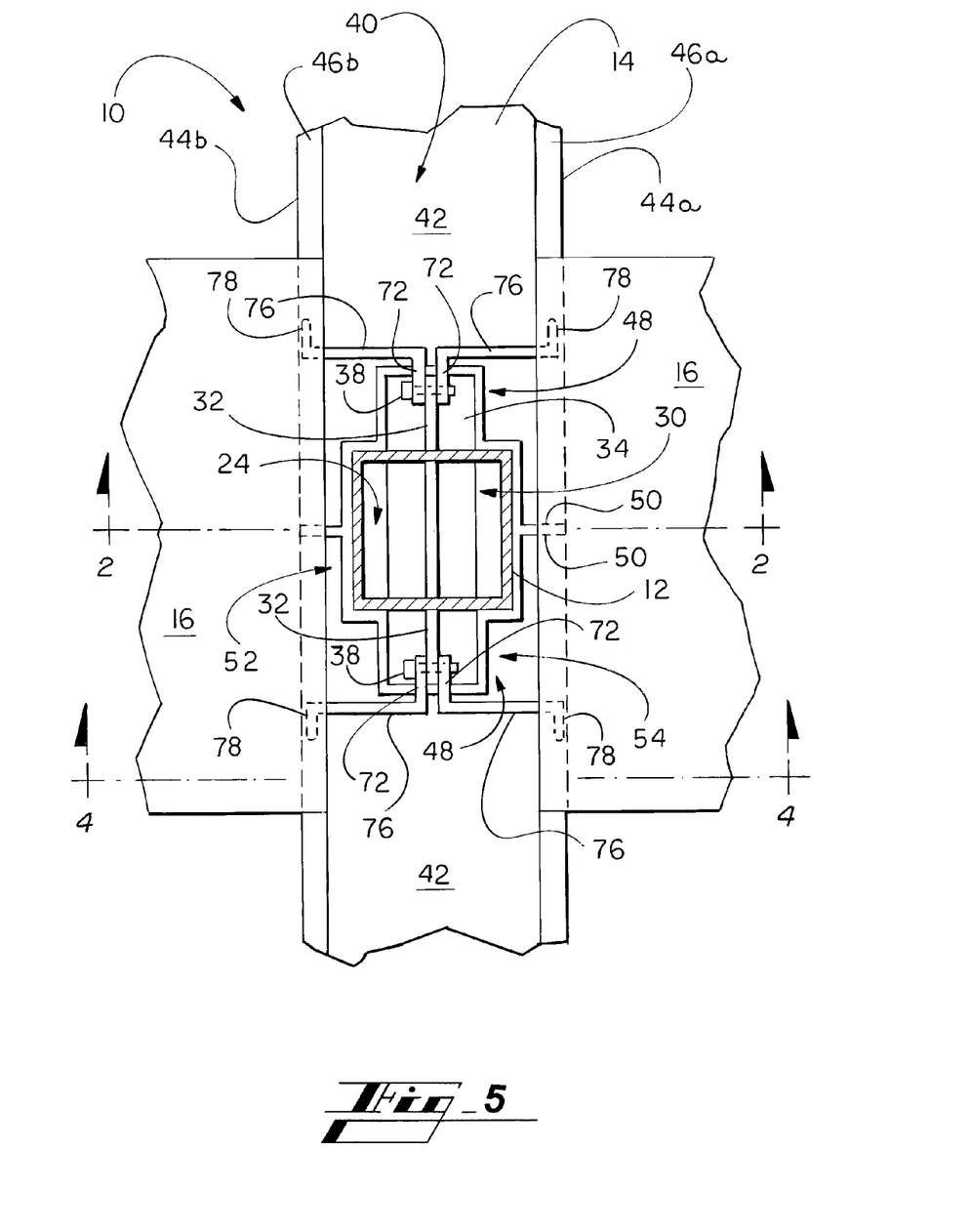
FIG. 5 is a fragmentary cross-sectional plan view of the framing structure of FIG. 2.

Referring to FIGS. 3-5, an exemplary method of assembling the column 12 and the T-beam 30 is now described. The T-beam 30 is inserted through the opposed openings 22a, 22b and spans the width of the column 12 with opposite ends extending from the column 12. The flange 34 rests on the lower edges of the openings 22a, 22b and the inner connecting plate 32 is substantially vertical. In alternative embodiments, such as those in which the column is pre-cast or cast-in-place concrete, the T-beam 30 is embedded or welded to the column 12.

Beam

Referring to FIGS. 2-5, the beam 14 has a trough-like or channel-like structure in the form of an upward facing cavity 40 that functions to receive and retain pourable materials. Although the exemplary beam 14 has a squared, U-shaped cross-section, in alternative embodiments, the cross-section of the beam 14 can be V-shaped, rounded U-shaped, I-shaped, H-shaped, and any other shape that provides the functionality described herein. The beam 14 includes a base wall 42 and sidewalls 44a, 44b that extend vertically upward from the base wall 42 so as to define the cavity 40 of the beam 14. Cantilevers 46a, 46b extend inwardly from the upper ends of the sidewalls 44a, 44b to provide a surface for supporting flooring sections 16, as described in further detail below. In other embodiments (not shown), the cantilevers 46a, 46b are arranged to extend outwardly from the sidewalls 44, one cantilever can extend inwardly and the other outwardly, or cantilevers can extend both inwardly and outwardly.

Continuing with FIGS. 3 and 5, a cutout 48 is defined in the base wall 42 at at least one end 50 of the beam 14. The illustrated cutout 48 is configured such that the column 12 can be received in the cutout 48 and such that the T-beam 30 does not obstruct the beam 14 during a method of connecting the column 12 to the beam 14, the method being described in further detail below.

A first portion 52 of the cutout 48 is shaped (e.g., squared) to correspond to the shaped (e.g., squared) cross-section of the column 12. A second portion 54 of the cutout 48 is shaped (e.g., squared) to correspond to the shape (e.g., generally square) of the flange 34. The depth of the first portion 52 is in some embodiments substantially equal to half of the depth of the column 12 and the width of the first portion 52 is in some embodiments substantially equal to the width of the column 12.

Thus, as illustrated in FIG. 5, when the column 12 is received in first portions 52 of the ends 50 of adjacent beams 14 in some embodiments, the ends 50 of the beams 14 substantially abut one another. This arrangement provides, in effect, a continuous beam passing through the column 12. The depth of the second portion 54 relative to the innermost edge of the first portion 52 is in some embodiments substantially equal to the distance that the T-beam 30 protrudes from the wall 20 of the column 12 and the width of the second portion 54 is in some embodiments substantially the width of the flange 34.

Closure Plate

Figure 2:
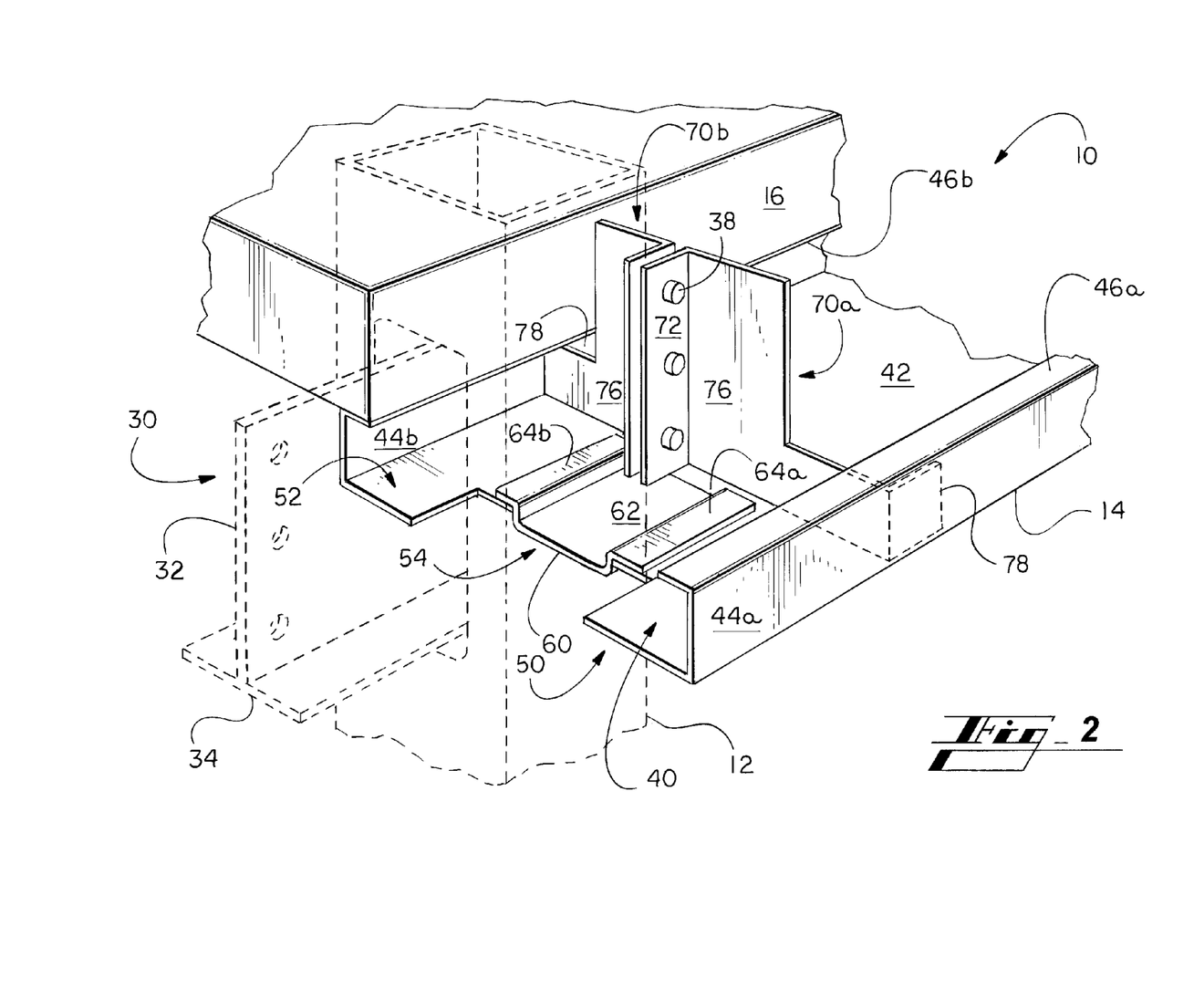
FIG. 2 is a fragmentary perspective view of elements of the framing structure of FIG. 1.

Referring to FIGS. 2-4, in some embodiments of the present disclosure, a closure plate 60 is configured to close the second portion 54 of the cutout 48. The illustrated closure plate 60 is configured for being snuggly positioned, such as by being frictionally held, in the second portion 54 and includes a main plate 62 and wings 64a, 64b. The main plate 62 is recessed relative to the wings 64a, 64b to maintain the position of the main plate 62 as it sets in the second portion 54. The wings 64a, 64b contact the base wall 42 to prevent the main plate 62 from falling through the second portion 54.

Second Connecting Element

Referring to FIGS. 2-5, the illustrated second connecting element is a pair of cantilever structures 70a, 70b that are substantially symmetrical to one another about a plane defined by the inner connecting plate 32 of the T-beam 30. Each cantilever structure 70a, 70b includes an outer connecting plate 72 and a lateral structure 74 configured to position the connecting plate 72 and facilitate securing the cantilever structure 70 to a sidewall 44 or bottom wall 42 of the beam 14. Each lateral illustrated structure 74 includes a transverse plate 76 and a tab 78 that is configured to abut the inside surface of the sidewall 44. The outer connecting plate 72 includes apertures 80 that are configured to receive the bolts 38.

Method of Assembling Beam and Second Connecting Element

Referring to FIGS. 2-5, an exemplary method of assembling the beam 14 and the cantilever structures 70 is now described. The tabs 78 are welded to the inside surface of the sidewall 44 such that the outer connecting plates 72 are positioned over the second portion 54 of the cutout 48. The illustrated tabs 78 are configured such that the cantilever structure 70 can be attached to the sidewall 44 with horizontal welds. Other means for attaching the cantilever structures 70 to the sidewall 44 or other parts of the beam 14 include bolts or other mechanical fasteners, welding, adhesives, and the like.

Flooring Sections

Referring to FIGS. 1-5, the illustrated flooring sections 16 are pre-cast concrete planks that include hollow voids 82. In alternative embodiments, flooring sections are metal deck sections, wood planks, solid pre-cast concrete planks, poured-in-place structures, double T planks, single T planks, post-tensioned pre-cast sections, composite structures, combinations thereof, and the like. The hollow voids 82 facilitate integration of the flooring sections 16 with the other elements of the framing structure 10, as described in further detail below. In the illustrated embodiment, the hollow voids 82 are plugged with a core stop 84 that is positioned within the hollow void 82 at a distance from the open end of the hollow void 82.

Method of Constructing the Framing Structure

An exemplary method of constructing the framing structure 10 is now described. It is contemplated that the framing structure 10 can be erected according to alternative methods, for example, by altering the order of the steps of the exemplary method or by adding steps to or omitting steps from the exemplary method.

Referring to FIG. 1, columns 12 are erected and beams 14 are positioned to extend longitudinally between erected columns 12 such that the cavities 40 of the beams 14 align with the openings 22 of the columns 12. Referring to FIG. 5, according to an exemplary method for positioning and connecting a beam 14 and a column 12 with a T-beam 30 and cantilever structures 70, columns 12 are connected to T-beams 30, as described above, and beams 14 are connected to cantilever structures 70, as also described above. The beam 14 is positioned such that the column 12 is received in the first portion 52 of the cutout 48 at a position above the associated T-beam 30.

The beam 14 is lowered toward the T-beam 30 such that the T-beam 30 moves through the second portion 54 of the cutout 48. As such, the inner connecting plate 32 of the T-beam 30 is received between the outer connecting plates 72 of the cantilever structures 70, the outer connecting plates 72 come to rest on the flange 34 of the T-beam 30, and the apertures 36, 80 of the connecting plates 32, 72 are aligned. At this stage, the end 50 of the beam 14 is positioned and supported and the framing structure 10 can be additionally constructed without supplemental support of the beam 14. The ends 50 of the beams 14 are positioned and supported by the connecting elements such that the cavities 40 of the beams 14 are aligned with the openings 22.

Referring to FIGS. 2, 3, and 5, the connecting plates 32, 72 and the bolts 38 provide a double shear bearing connection as the bolts 38 are inserted through the aligned apertures 36, 80 of the connecting plates 32, 72. The thickness of each of the connecting plates 32, 72 can be varied according to different capacity needs.

Referring to FIGS. 2-4, the closure plate 60 slides under the flange 34 and is received in and closes the second portion 54 of the cutout 48. The closure plate 60 is configured to allow poured bonding material 18 to flow between the T-beam 30 and the closure plate 60 to provide additional fire resistance.

Referring momentarily to FIG. 5, as mentioned above, the ends 50 of adjacent aligned beams 14 abut one another and a column 12 is received in the first portions 52 of the cutouts 48. The abutting beams 14 provide a substantially continuous beam 14 having a base wall 42 that is interrupted by a column 12. It should be noted that the abutting beams 14 are substantially continuous along the sidewall 44, the cantilevers 46, and portions of the base walls 42 such that pourable bonding material 18 in the cavities 40 can flow around the exterior of the column 12. The connecting elements 30, 70 are also configured to facilitate flow of the pourable bonding material 18.

Referring now to FIGS. 1-5, the illustrated flooring sections 16 are set on beams 14 such that one end of each of the flooring sections 16 is supported on the support surface provided by a cantilever 46 of one beam 14 and the opposite end of each of the flooring sections 16 is supported on the support surface provided by a cantilever 46 of another of the beams 14. As such, the hollow voids 82 open to cavities 40. Because illustrated abutting beams 14 provide substantially continuous cantilevers 46 or are otherwise not interrupted by the columns 12, the flooring sections 16 can abut one another along transverse edges to provide a substantially continuous floor or level, even near the columns 12.

In alternative embodiments, only one end or section of a flooring section 16 is supported by a beam 14 while an opposite end is cantilevered over another beam or supported by another shape of beam.

Referring momentarily to FIGS. 2 and 4, the flooring sections 16, in effect, increase the depth of the cavities 40. It should be noted that in the illustrated embodiments, the adjacent ends of the adjacent flooring sections 16 are spaced apart so as to not enclose the cavities 40. As mentioned above, the hollow voids 82 are disposed in the ends of the flooring sections 16 that are adjacent the cavities 40 such that the hollow voids 82 are filled as the cavities 40 are filled. In alternate embodiments, the distance the adjacent ends are spaced apart varies.

Referring now to FIG. 4, a pourable bonding material 18 such as concrete is poured to first fill the hollow interiors 24. The pourable bonding material 18 is in some embodiments directly poured into the hollow interiors 24 through the openings 22 or, as the pourable bonding material 18 is poured into the cavities 40, the pourable bonding material 18 is channeled through the openings 22 to fill the hollow interior 24 of the columns 12. Once the columns 12 are filled up to substantially the height of the base wall 42 of the beams 14, the cavities 40 then continue to fill until the level of pourable bonding material 18 reaches the height to fill the beams 14 and embed the connecting elements 30, 70.

The cavities 40 continue to fill until the level of pourable bonding material 18 is substantially coplanar with the top surface of the flooring sections 16 so as to fill the hollow voids 82. Since the hollow voids 82 are plugged with the core stops 84, the hollow voids 82 are only filled to a certain depth, which reduces the weight of the framing structure 10. The illustrated pourable bonding material 18 is further poured to define a layer of floor thickness that tops the flooring sections 16. This layer of floor thickness increases the rigidity of the framing structure 10. Once the pourable bonding material 18 solidifies, the resulting poured bonding core 18 integrally connects the beams 14, the columns 12, and the flooring sections 16 to provide the integrated framing structure 10.

Figure 6:
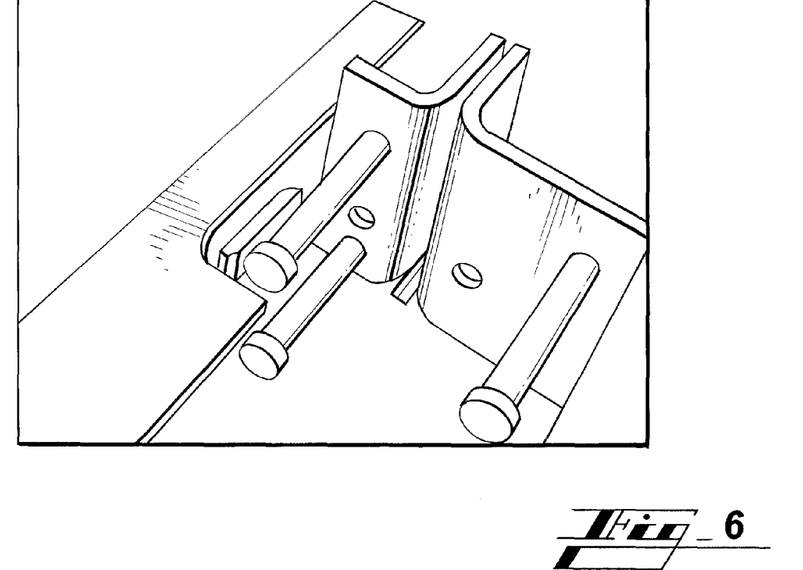
FIGS. 6 and 7 are partial perspective views of a framing structure, according to another exemplary embodiment of the present disclosure.
Figure 7:
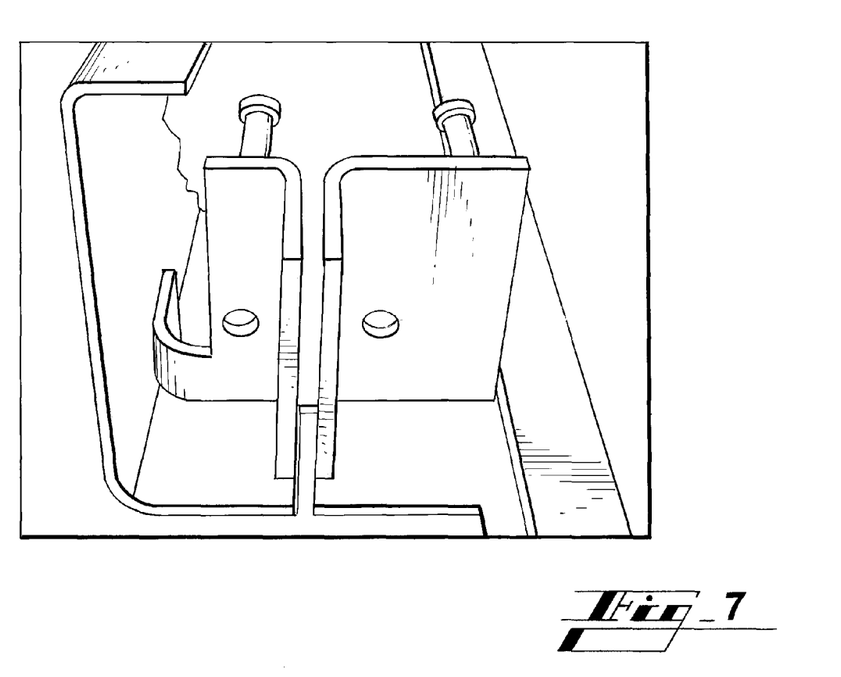

FIGS. 6 and 7 illustrate an alternatively shaped beam and cantilever structures that include apertures for receiving rebar (not shown) and studs. The rebar and studs increase the shear friction capacity of the structure.

The above-described embodiments are merely exemplary illustrations of implementations set forth for a clear understanding of the principles taught by the disclosure. Variations, modifications, and combinations may be made to the above-described embodiments without departing from the scope of the claims. All such variations, modifications, and combinations are included herein by the scope of this disclosure and the following claims.

What is claimed is:

1. A system, comprising:
   a column;
   a first connecting element extending from the column, the first connecting element comprising a first vertical connecting plate and a lower flange;
   a beam comprising:
      a base wall and opposed sidewalls extending upward from the base wall; the base wall and opposed side walls at least partially defining a cavity; and
   a second connecting element disposed in the cavity and connected to one of the walls of the cavity, wherein the first connecting element and the second connecting element are removably connected to one another and thereby the beam is connected to the column, the second connecting element comprising a second vertical connecting plate, wherein the first vertical connecting plate and the second vertical connecting plate are substantially parallel to one another and substantially in contact with one another.

2. The system of claim 1, wherein a bolt is received through aligned apertures in each of the first vertical connecting plate and the second vertical connecting plate to provide a shear bearing connection.

3. The system of claim 1, wherein the second connecting element comprises a first lateral structure that is configured to position the second vertical connecting plate in the cavity, wherein the first lateral structure is connected to a wall of the cavity.

4. The system of claim 1, wherein the first connecting element is a T-beam.

5. The system of claim 1, wherein:
   the column comprises a hollow interior and an opening to the hollow interior; and
   wherein the first vertical connecting plate and the lower flange extend through the opening.

6. The system of claim 1, further comprising a concrete core that at least partially surrounds the first connecting element and the second connecting element.

7. The system of claim 1, wherein the beam further includes at least one cantilever that extends from one of the opposed side walls.

8. The system of claim 1, comprising a cutout in the base wall, the cutout comprising:
   a first portion that is configured to receive the column; and
   a second portion that is configured to allow the beam to drop in over the first connecting element.

9. The system of claim 8, comprising a closing plate that is configured to close the second portion of the cutout.

10. The system of claim 1, the second connecting element comprising a third vertical connecting plate, wherein a surface of the first vertical connecting plate and a surface of the third vertical connecting plate are substantially in parallel with and substantially in contact with one another.

11. The system of claim 10, wherein the first vertical connecting plate is in between the second vertical connecting plate and the third vertical connecting plate.

12. The system of claim 10, wherein a bolt is received through aligned apertures in each of the first vertical connecting plate, the second vertical connecting plate and the third vertical connecting plate to provide a double shear bearing connection.

13. The system of claim 10, wherein the second connecting element comprises:
   a first lateral structure that is configured to position the second vertical connecting plate in the cavity, wherein the first lateral structure is connected to a wall of the cavity; and
   a second lateral structure that is configured to position the third vertical connecting plate in the cavity, wherein the second lateral structure is connected to a wall of the cavity.

14. The system of claim 13, wherein at least one of the first lateral structure and the second lateral structure have a minimum height that is less that the height of at least one of the opposed side walls.

15. The system of claim 10, wherein the second vertical connecting plate and the third vertical connecting plate are supported on the lower flange.

16. The system of claim 15, wherein the column comprises a hollow interior and an opening to the hollow interior;
   wherein the first vertical connecting plate and the lower flange extend through the opening; and
   wherein the second vertical connecting plate and the third vertical connecting plate are supported on the lower flange to align the cavity with the opening.

17. The system of claim 1, comprising a cutout in the base wall, the cutout comprising:
   a first portion that is configured to receive the column; and
   a second portion that is configured to receive the first vertical connecting plate.

18. The system of claim 17, wherein the first vertical connecting plate extends through the second portion of the cutout and the base wall is supported on the lower flange.

19. A method for forming a framing structure, the method comprising:
  inserting a first connecting element through an opening of a column so that at least one end of the first connecting element extends out of the column, the first connecting element comprising a first vertical connecting plate and a lower flange;
  connecting an end of a beam to the column, the beam comprising:
    a base wall and opposed sidewalls extending upward from the base wall; the base wall and opposed side walls at least partially defining a cavity; and
    a cutout in the base wall, the cutout comprising:
      a first portion that is configured to receive the column; and
      a second portion that is configured to receive at least a portion of the first connecting element; and
    a second connecting element that is configured to connect to the first connecting element, the second connecting element comprising a second vertical connecting plate and a third vertical connecting plate; and
  the connecting step, comprising:
    lowering the beam onto the extended end of the first connecting element;
    receiving the column in the first portion of the cutout; and
    receiving the first vertical connecting plate through the second portion of the cutout and in between the second vertical connecting plate and the third vertical connecting plate; and
    inserting a bolt through aligned apertures of each of the first vertical connecting plate, the second vertical connecting plate, and the third vertical connecting plate.

20. The method of claim 19, the connecting step comprising supporting the second vertical connecting plate and the third vertical connecting plate on the lower flange.

* * * * *